US012313095B2

(12) United States Patent
DeSalvo

(10) Patent No.: US 12,313,095 B2
(45) Date of Patent: May 27, 2025

(54) FLUID POWER ACTUATOR UTILIZING A SCREW AND NUT ASSEMBLY

(71) Applicant: Textron Systems Corporation, Hunt Valley, MD (US)

(72) Inventor: Thomas James DeSalvo, Finksburg, MD (US)

(73) Assignee: Textron Systems Corporation, Hunt Valley, MD (US)

( * ) Notice: Subject to any disclaimer, the term of this patent is extended or adjusted under 35 U.S.C. 154(b) by 0 days.

(21) Appl. No.: 18/235,224

(22) Filed: Aug. 17, 2023

(65) Prior Publication Data

US 2025/0059989 A1 Feb. 20, 2025

(51) Int. Cl.
*F15B 15/14* (2006.01)
*F15B 15/20* (2006.01)

(52) U.S. Cl.
CPC .. *F15B 15/1466* (2013.01); *F15B 2015/1495* (2013.01); *F15B 2015/206* (2013.01)

(58) Field of Classification Search
CPC .......... F15B 15/1466; F15B 2015/1495; F15B 2015/206
See application file for complete search history.

(56) References Cited

U.S. PATENT DOCUMENTS 4,932,311 A * 6/1990 Mibu .................. G05B 19/232 92/33
5,085,401 A 2/1992 Botting et al.
6,927,513 B2 8/2005 Schreier
7,397,209 B2 * 7/2008 Hirai .................... F15B 15/088 310/112
8,474,339 B2 * 7/2013 Hirai ...................... B64C 25/24 74/89.23
8,561,491 B2 10/2013 Fukano et al.
8,573,080 B2 11/2013 Quenerch'Du et al.
8,636,262 B2 1/2014 Schade et al.
8,701,834 B2 4/2014 Jacob et al.
8,823,229 B2 9/2014 Brieschke
9,568,077 B2 2/2017 Jacob et al.
9,772,013 B2 9/2017 Tsai
(Continued)

FOREIGN PATENT DOCUMENTS

EP 0163602 A2 * 12/1985 ............. F15B 15/20

OTHER PUBLICATIONS

EP0163602A2_t machine translation thereof (Year: 1985).*

*Primary Examiner* — Matthew Wiblin
(74) *Attorney, Agent, or Firm* — BainwoodHuang

(57) ABSTRACT

A fluid power actuator includes a housing, a piston rod assembly, and a screw and nut assembly. The housing includes a cylinder, a blind end cap, rod end cap, and mounting provisions. The piston rod assembly connects to an external load and is constructed and arranged to move relative to the fluid power actuator housing in response to changes in fluid pressure within the cylinder. The screw and nut assembly couples with the housing and the piston rod assembly. The screw and nut assembly is constructed and arranged to control movement of the piston rod assembly relative to the housing using a motor or a brake. Such a fluid power actuator provides precision positioning, is self-locking on loss of power, and allows back-up manual operation, making it well-suited for various material handling applications such as precision munitions loading, among others.

19 Claims, 7 Drawing Sheets

(56) References Cited

U.S. PATENT DOCUMENTS

| | | | |
|---|---|---|---|
| 9,803,663 | B2 | 10/2017 | Vanderveen et al. |
| 9,933,058 | B1 | 4/2018 | Muster |
| 9,964,198 | B2 | 5/2018 | Brage et al. |
| 10,024,406 | B2 | 7/2018 | Stensgaard |
| 10,088,024 | B2 | 10/2018 | Högberg et al. |
| 10,371,275 | B2 | 8/2019 | Lenz |
| 10,480,547 | B2 | 11/2019 | Starkey et al. |
| 10,502,293 | B2 | 12/2019 | Foucaut et al. |
| 10,619,653 | B2 | 4/2020 | Grupp et al. |
| 10,801,594 | B2 | 10/2020 | Burgess |
| 10,822,856 | B2 | 11/2020 | Leonard et al. |
| 11,092,175 | B1 * | 8/2021 | Blanding ................ F15B 21/08 |
| 2009/0095098 | A1 | 4/2009 | Fisher et al. |
| 2015/0323049 | A1 | 11/2015 | Rousseau et al. |
| 2019/0003548 | A1 * | 1/2019 | Fox ....................... F15B 15/088 |
| 2019/0309836 | A1 | 10/2019 | Laurent |
| 2022/0099112 | A1 * | 3/2022 | Noda ..................... H02K 33/16 |

* cited by examiner

FLUID POWER ACTUATOR UTILIZING A SCREW AND NUT ASSEMBLY

BACKGROUND

A conventional hydraulic or pneumatic fluid power linear actuator includes a cylinder, a piston, and a piston rod. The cylinder restricts the piston to linear movement along a central axis defined by the cylinder. The piston rod allows mechanical connection from the piston to an external load.

The stoke of the piston within the cylinder (i.e., how far the piston and piston rod moves in the cylinder) depends on the magnitude of the external load, the fluid pressure and flow rate and the duration of the applied fluid pressure. For example, with a single acting cylinder, increasing the fluid pressure within the rear chamber extends the piston rod when the pressure times the cylinder bore area exceeds the external load. However, decreasing the fluid pressure within the rear chamber retracts the piston rod when the pressure times the cylinder bore area is less than the external load.

It should be understood that there are deficiencies to conventional fluid power actuators. Along these lines, the above-described conventional fluid power linear actuator typically provides imprecise position control, is susceptible to leaking/drifting over time, and may require external locking devices or redundant actuators to prevent loss of load control during a failure. Accordingly, the conventional fluid power actuator may not be ideal for certain precision material handling applications such as loading munitions onto an aircraft.

Unfortunately, conventional electric linear actuators are very expensive for high-force applications, routinely require lubrication, provide difficulties in manually moving loads during loss of electric power, and are not normally designed with high enough structural safety factors required by safety certification standards (e.g., American Society of Mechanical Engineers (ASME) standards for lifting devices or U.S. Air Force nuclear certification). Conventional electric linear actuators are also more difficult to package as the electric motor, brake, and drive train transmission must be packaged along with the linear actuator.

Similarly, conventional electro-hydraulic linear actuators have disadvantages of both fluid power actuators and electric linear actuators. Specifically, they are subject to the same disadvantages of fluid power linear actuators as described above and are more difficult to package inside compact areas, as an electric motor, a hydraulic fluid pump, reservoir and valve assemblies, etc. are all mounted directly to an electro-hydraulic linear actuator.

SUMMARY

In contrast to the above-described conventional linear actuators, improved techniques involve a fluid power actuator that utilizes a screw and nut assembly. The screw and nut assembly enhances fluid power actuator performance such as by providing high precision positioning, simple mechanical locking, and convenient manual back-up operation. In some arrangements, the screw and nut assembly has a self-locking thread geometry (e.g., ACME threads). In some arrangements, the screw and nut assembly has a recirculating ball screw or roller screw geometry for low friction operation. Such techniques overcome various deficiencies of conventional fluid power, electric, and electro-hydraulic linear actuators.

One embodiment is directed to a fluid power actuator that includes:

(A) a housing comprising a cylinder, an end cap to seal a blind end of the cylinder, a rod end cap to guide a piston rod relative to the cylinder, and a load-bearing mounting provision to secure the housing to an external structure, (B) a piston rod assembly comprising a piston that travels within the cylinder in response to fluid pressure within the cylinder, the piston having a nut, and the piston rod connecting the piston to an external load using a piston rod end, the piston rod being hollow to allow a screw to be partially or fully located inside the piston rod, and (C) a screw and nut assembly comprising a screw that couples the blind end of the cylinder to the nut, wherein the screw extends in part or in whole inside the piston rod, the screw and nut assembly being constructed and arranged to control movement of the piston relative to the housing, and a motor that controls rotation of the screw or the nut.

In some arrangements, the motor controls rotation of the screw relative to a non-rotating nut.

In some arrangements, the motor controls rotation of the nut relative to a non-rotating screw.

In some arrangements, the screw is self-locking.

In some arrangements, the screw is non-self-locking and the motor contains a brake.

In some arrangements, the fluid power actuator further includes a load cell that measures an axial load on the screw or nut, and a controller that adjusts fluid pressure on at least one side of the piston to adjust the axial load.

In some arrangements, the fluid power actuator further includes an external position sensor that augments position actuator control logic using a closed-loop position control.

In some arrangements, motor and/or brake torque application and/or release is timed based on previously measured and recorded load command and response behavior.

In some arrangements, the fluid power actuator further includes a control system that uses an external load cell to measure axial load directly or indirectly, calculates fluid pressure, and controls fluid pressure with an open-loop control system.

In some arrangements, the fluid power actuator further includes a control system that uses an external load cell to measure axial load directly or indirectly, calculates the desired pressure, and controls fluid pressure with a closed-loop control system using at least one pressure transducer.

Another embodiment is directed to a fluid power actuator which includes:

(A) a housing comprising a cylinder, an end cap to seal a blind end of the cylinder, a rod end cap to guide a piston rod relative to the cylinder, and a load-bearing mounting provision to secure the housing to an external structure, (B) a piston rod assembly comprising a piston that travels within the cylinder in response to fluid pressure within the cylinder, the piston having a nut, and the piston rod connecting the piston to an external load using a piston rod end, the piston rod being hollow to allow a screw to be partially or fully located inside the piston rod, and (C) a screw and nut assembly comprising a screw that couples the blind end of the cylinder to the nut, wherein the screw extends in part or in whole inside the piston rod, the screw and nut assembly being constructed and arranged to control movement of the piston relative to the housing, and a brake that controls rotation of the screw or nut.

In some arrangements, the brake controls rotation of the screw relative to a non-rotating nut.

In some arrangements, the brake controls rotation of the nut relative to a non-rotating screw.

In some arrangements, the screw is a non-self-locking recirculating ball screw, roller screw, or ACME screw.

In some arrangements, the fluid power actuator further includes a load cell that measures an axial load on the screw or nut, and a controller that adjusts fluid pressure on at least one side of the piston to adjust the axial load.

In some arrangements, the fluid power actuator further includes an external position sensor that augments position actuator control logic using a closed-loop position control.

In some arrangements, motor and/or brake torque application and/or release is timed based on previously measured and recorded load command and response behavior.

In some arrangements, the fluid power actuator further includes a control system that uses an external load cell to measure axial load directly or indirectly, calculates fluid pressure, and controls fluid pressure with an open-loop control system.

In some arrangements, the fluid power actuator further includes a control system that uses an external load cell to measure axial load directly or indirectly, calculates the desired pressure, and controls fluid pressure with a closed-loop control system using at least one pressure transducer.

Other embodiments are directed to apparatus, devices, and related componentry. Some embodiments are directed to various vehicles, equipment, tools, systems, sub-systems, methods, and so on, which involve a fluid power actuator that utilizes a screw and nut assembly.

This Summary is provided merely for purposes of summarizing some example embodiments so as to provide a basic understanding of some aspects of the disclosure. Accordingly, it will be appreciated that the above-described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Overview

An improved technique involves a fluid power actuator that utilizes a screw and nut assembly. The screw and nut assembly enhances fluid power actuator performance by providing high precision positioning, offering mechanical locking, and lending to convenient manual back-up operation, among other features. In accordance with certain embodiments, the screw and nut assembly has a self-locking thread geometry (e.g., ACME thread with low efficiency) and is paired with a motor to actuate the screw or nut rotation. In accordance with certain embodiments, the screw and nut assembly has a recirculating ball screw or roller screw geometry for low friction operation and paired with a brake to prevent screw or nut rotation. Such techniques overcome a variety of deficiencies in conventional fluid power, electric and electro-hydraulic linear actuators.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
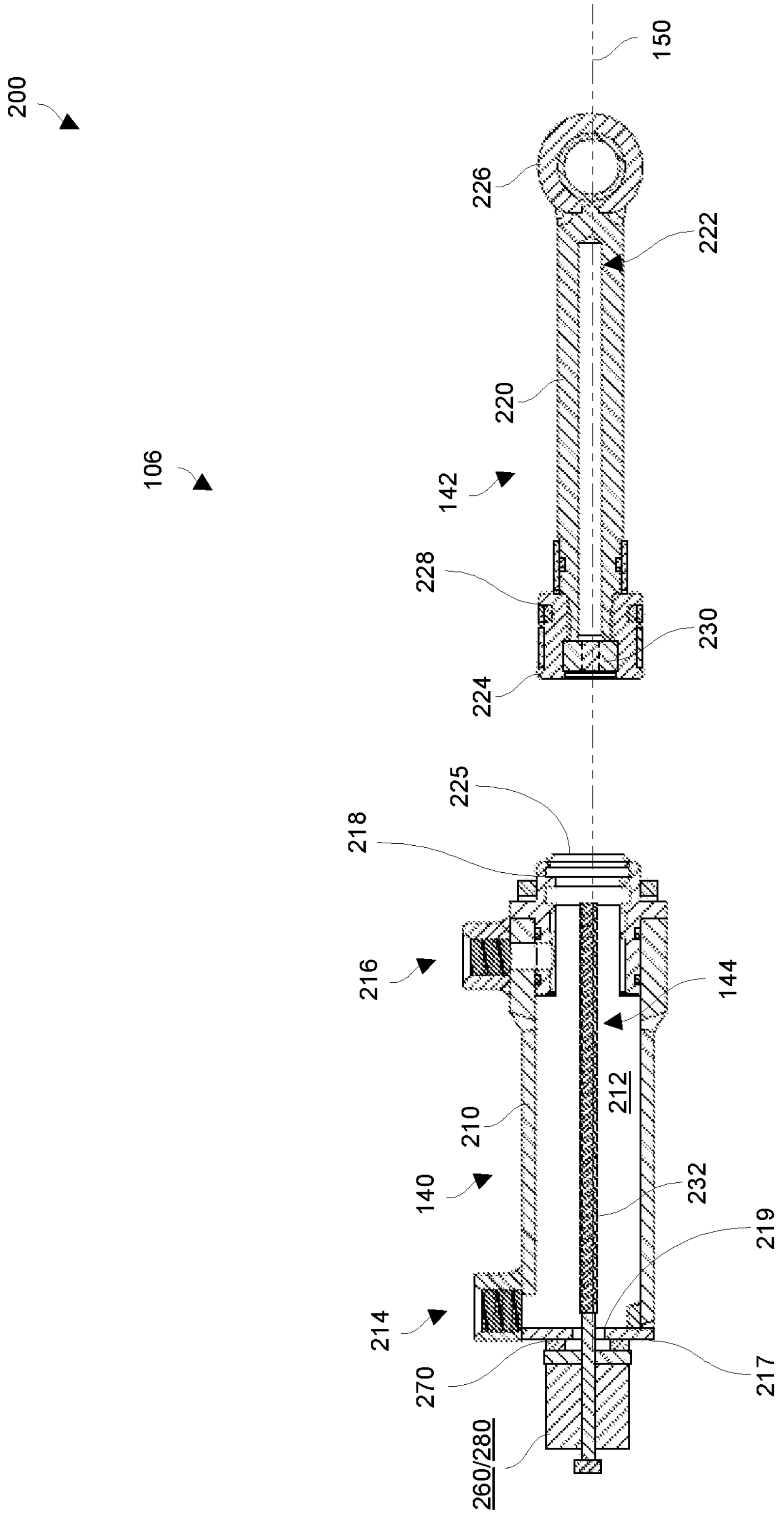
FIG. 1 is a cross-sectional, partially exploded view of a fluid power actuator which utilizes a screw and nut assembly in accordance with certain embodiments.
Figure 2:
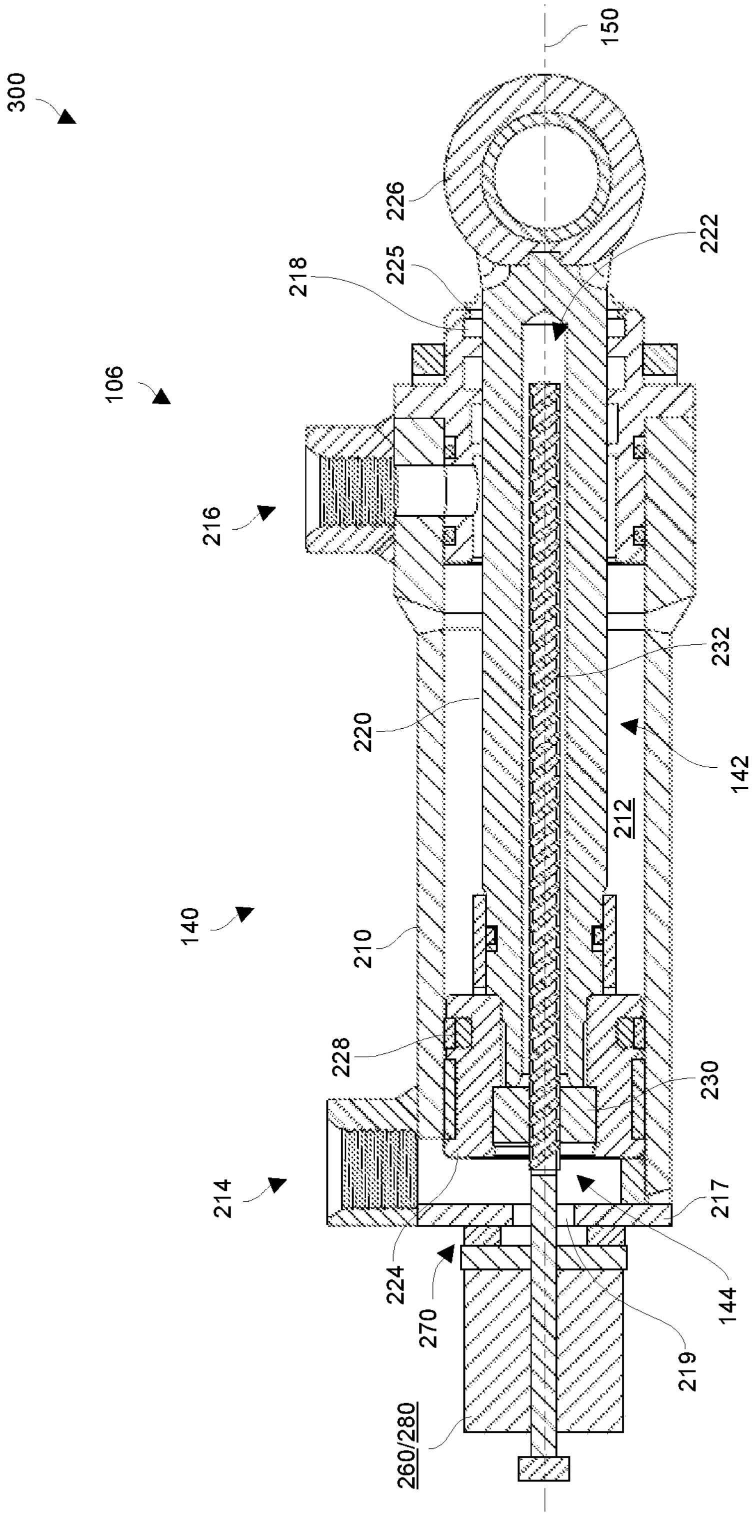
FIG. 2 is a cross-sectional side view of the fluid power actuator of FIG. 1 in a first retracted configuration in accordance with certain embodiments.
Figure 3:
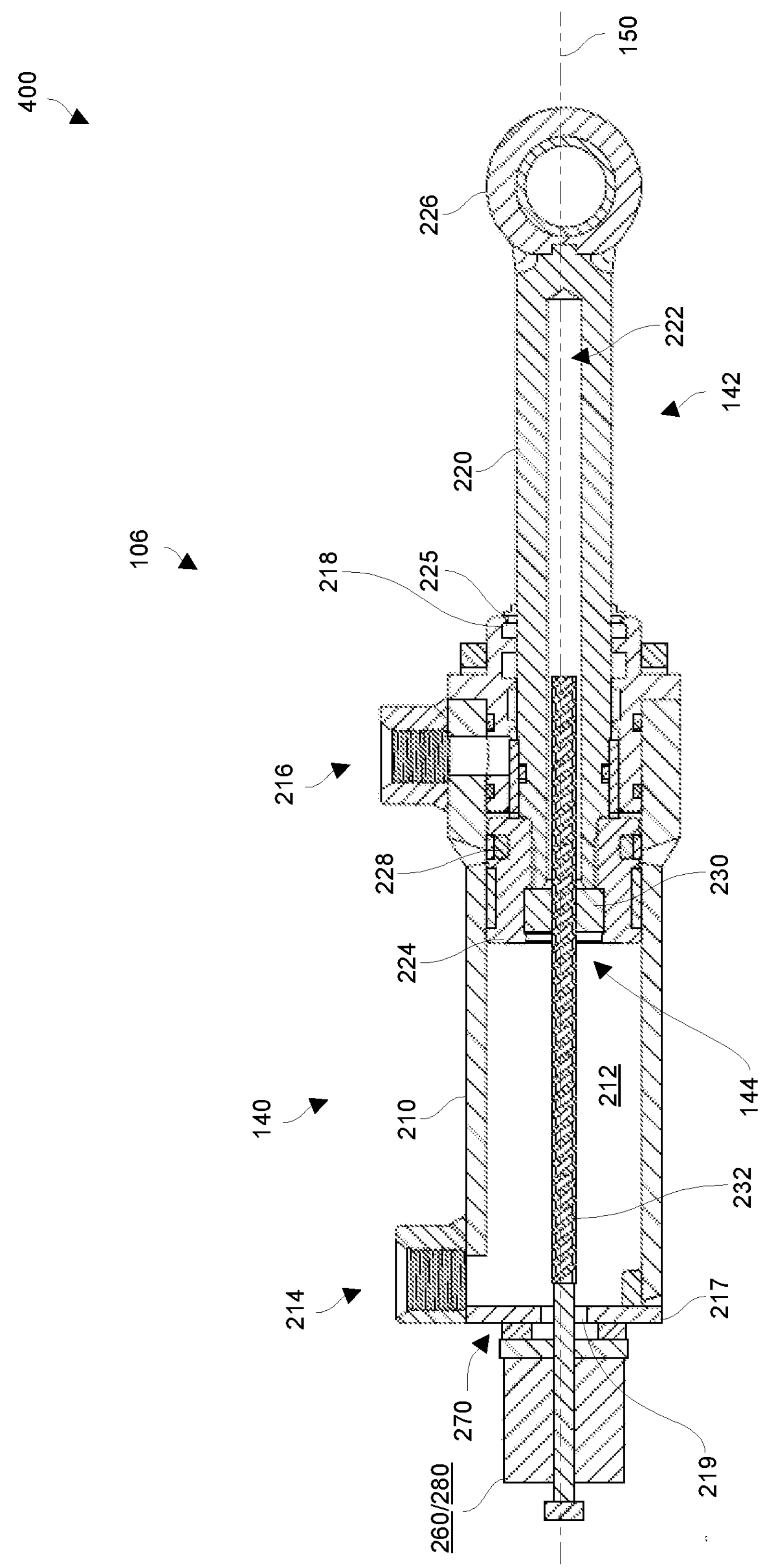
FIG. 3 is a cross-sectional side view of the fluid power actuator of FIG. 1 in a second extended configuration in accordance with certain embodiments.

FIGS. 1 through 3 show certain details of a fluid power actuator 106 in accordance with certain embodiments. FIG. 1 is a cross-sectional, partially exploded view 200 of the fluid power actuator 106. FIG. 2 is a cross-sectional side view 300 of the fluid power actuator 106 in a retracted state. FIG. 3 is a cross-sectional side view 400 of the fluid power actuator 106 in an extended state.

As best seen in FIG. 1, the fluid power actuator housing 140 of the fluid power actuator 106 has a cylindrical barrel 210 which defines an internal cylindrical volume 212 (herein called cylinder) to house a portion of the piston rod assembly 142 comprised of a piston 224 and a piston rod 220, all sharing an actuator axis 150. The cylinder 212 is closed at one end by a blind end cap 217 and at the opposite end by a rod end cap 225. Additionally, the fluid power actuator housing 140 further defines a first fluid port 214 and an optional second fluid port 216 which enable fluid to enter and exit the cylinder 212 acting on both sides of the piston 224 when the piston 224 is installed inside the cylinder 212. In certain arrangements, the actuator is a single acting actuator with a spring or gravity return in which only one fluid port is used.

Also, as best seen in FIG. 1, the piston rod assembly 142 includes piston rod 220 that defines an elongated central bore 222 which extends along the actuator axis 150. When the fluid power actuator 106 is assembled, at least part of the piston rod 220 resides within the cylinder 212 defined by the fluid power actuator housing 140 (see FIGS. 2 and 3).

In some arrangements, the piston 224 further defines other features such as a piston seal 228 that forms a fluid seal with the cylindrical barrel 210. That is, when the fluid power actuator 106 is assembled, the piston 224 and piston seal 228 divide the cylinder 212 into different sealed chambers thus enabling fluid pressure within the chambers to drive the piston rod assembly 142 in and/or out of the fluid power actuator housing 140.

Likewise, in some arrangements, the fluid power actuator housing 140 defines other features such as a piston rod seal 218 which forms a fluid seal between the piston rod 220 and the fluid power actuator housing 140.

In some arrangements, the piston rod 220 further has a piston rod end 226 at the end opposite to the piston 224 that enables coupling to a load. The piston rod end 226 enables the piston rod assembly 142 to easily couple (e.g., hinge or pivot) with the lift arm 104 (also see FIG. 1).

As further shown in FIGS. 1 through 3, the screw and nut assembly 144 includes a nut 230 and a screw 232. The nut 230 resides in a fixed position in the piston rod assembly 142 (e.g., near the piston 224 end of the piston rod assembly 142). Furthermore, part of the screw 232 is threaded, and this threaded part of the screw 232 is constructed and arranged to engage with the nut 230 (FIGS. 2 and 3). While in this threaded situation, at least a portion of the screw 232 is disposed within the interior of the piston rod 220 defined by the central bore 222 of the piston rod assembly 142, and extends along the actuator axis 150.

In one embodiment, the screw 232 is allowed to rotate relative to the fluid power actuator housing 140 and about the actuator axis 150 under certain conditions. Such rotation enables the piston rod assembly 142 of the fluid power actuator 106 to move relative to the fluid power actuator housing 140 along the actuator axis 150 (e.g., to translate linearly along the actuator axis 150).

In certain arrangements, fluid pressure is used to extend or retract the piston and piston rod. For example, making the fluid pressure at the port 214 times the cylinder 212 bore area greater than the sum of the fluid pressure at the port 216 times the annular area (defined by bore area minus piston rod area) plus the force needed to overcome the load attached to the piston rod end 226 provides a force to extend the piston rod assembly 142 along the axis 150. Similarly, making the fluid pressure at the port 214 times the cylinder 212 bore area less than the sum of fluid pressure at the port 216 times the annular area plus the force needed to overcome the load attached to the piston rod end 226 provides a force to retract the piston 224 and piston rod 220 along the axis 150.

The fluid power actuator 106 includes additional devices such as a motor 260, a set of load sensors 270, and/or a brake 280. The motor 260 may be an electric, hydraulic or pneumatic powered motor. The motor 260 is constructed and arranged to rotate the screw 232 of the screw and nut assembly 144. The set of load sensors 270 is constructed and arranged to provide a set of load signals indicating axial loading on the screw 232 (e.g., a measurement of the current amount of axial load between the fluid power actuator housing 140 and the screw 232). In one embodiment, the fluid pressure on one or both fluid ports 214 and 216 are controlled in a closed-loop manner to make the load cell 270 read a near-zero load, thus enabling a low-torque, low-powered, and/or low-cost motor to turn the screw and extend or retract the actuator.

In another embodiment, the brake 280 is paired with a non-self-locking screw and constructed and arranged to prevent the screw 232 from turning relative to the fluid power actuator housing 140 when the brake is engaged (or applied) and allows the screw 232 to turn relative to the fluid power actuator housing 140 when the brake is disengaged (or released).

In some embodiments, the fluid power actuator assembly 106 is implemented in equipment that includes a base and a lift arm. Such equipment advantageously enjoys high precision positioning, offers mechanical locking, and lends to convenient manual back-up operation, among other advantages.

By way of example only, the equipment may take the form of a loading apparatus such as a munitions loader. However, it should be understood that the equipment may have different shapes, sizes, configurations, arrangements, structures, etc. combinations thereof, other than that shown. Other suitable types of equipment include road vehicles, watercraft, aircraft, industrial machinery, heavy duty robotics, combinations thereof, and so on.

In some embodiments, the base is constructed and arranged to serve as a structural foundation and provide support for the equipment. The base may be configured to reside at a fixed location and/or move among different locations as a vehicle chassis. In some arrangements, the base may be provisioned with a set of vehicle components (e.g., tires, tracks, propellers, combinations thereof, etc.), a set of motors for propulsion/mobility (e.g., combustion engines, electric motors, combinations thereof, etc.), a power source for powering the set of motors, and so on.

In some embodiments, the lift arm is constructed and arranged to manage (or carry) a set of loads while providing linkage with the base. Along these lines, the lift arm may have a first end that couples with the base and a second end that interfaces with the set of loads.

In some embodiments, the fluid power actuator 106 is constructed and arranged to maneuver a lift arm. Recall that the fluid power actuator 106 includes the fluid power actuator housing 140, the piston rod assembly 142, and the screw and nut assembly 144. The fluid power actuator housing 140 may mechanically couple with a base (e.g., at a first hinge or pivot location), and the piston rod assembly 142 may mechanically couple with a lift arm (e.g., at a second hinge or pivot location). The piston rod assembly 142 may be restrained (e.g., internally, externally, etc.) to prevent rotation relative to the fluid power actuator housing 140.

In some embodiments, the screw and nut assembly 144 mechanically couples with both the fluid power actuator housing 140 and the piston rod assembly 142. The screw and nut assembly 144 works in conjunction with a fluid power source and control system to operate the fluid power actuator 106 to selectively enable the piston rod assembly 142 to move along the actuator axis 150 and lock/hold the piston rod assembly 142 in place relative to the fluid power actuator housing 140. The fluid power source and a control system can be directly mounted to the fluid power actuator 106, or be located within a base or located at a remote location relative to the equipment.

As will be explained in further detail shortly, the fluid power actuator 106 may precisely control positing of a lift arm (e.g., during loading, during unloading, etc.), provides stability (e.g., locking in place to eliminate drift and maintain positing), and enables convenient and simple manual backup operation (e.g., to enable operation even without power). Accordingly, the fluid power actuator 106 is well-suited for various tasks in which factors such as accuracy, reliability, and safety are critical.

It should be understood that the lift arm may include multiple joints, hinges, arms, etc., and that the equipment may include other mechanisms such as an additional set of actuators to operate the lift arm at various points. One or more of the additional set of actuators may be provisioned with one or more respective screw and nut assemblies 144 in the same manner as that for the fluid power actuator 106.

Further, it should be appreciated that fluid power actuator 106 may take a variety of different embodiments. Depending on the particular embodiment, one or more of these above-described devices may be present (or may be optional). Various details for particular embodiments of the fluid power actuator 106 will now be provided in further detail.

First Embodiments

Figure 4:
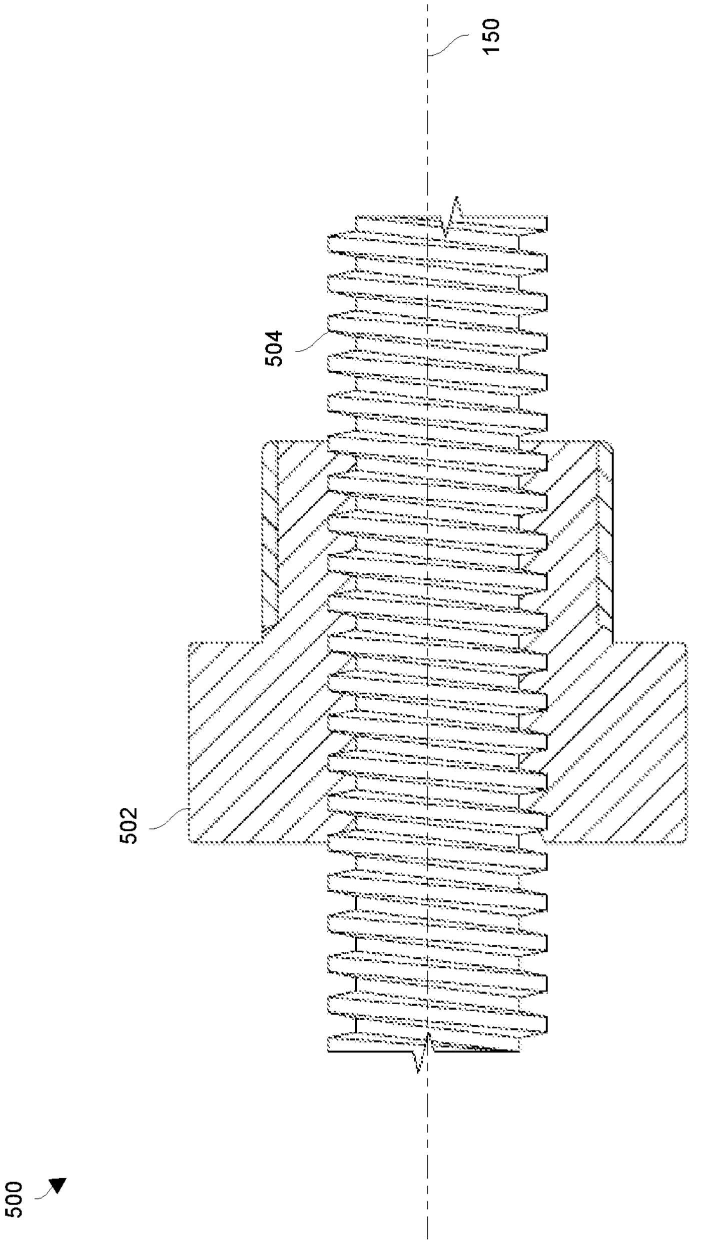
FIG. 4 is a cross-sectional view of an example screw and nut assembly which is suitable for use in the fluid power actuator of FIG. 1 in accordance with certain embodiments.

FIG. 4 shows a cross-sectional side view of a set of screw and nut assembly components 500 which is suitable for use for the screw and nut assembly 144 of the fluid power actuator 106 in accordance with certain first embodiments for the fluid power actuator 106. The set of screw and nut assembly components 500 includes a nut 502 and a screw 504 (only a portion of which is shown in FIG. 4).

The actuator axis 150 defined by the fluid power actuator housing 140 is also shown in FIG. 4 to illustrate the orientation of the set of screw and nut assembly components 500 in the context of the fluid power actuator 106 (also see FIGS. 1 through 3). When the set of screw and nut assembly components 500 is employed by the fluid power actuator 106, the nut 502 is disposed in a fixed position relative to the piston rod 220 of the piston rod assembly 142, and the screw 504 threads within the nut 502. One portion (e.g., a smooth section) of the screw 504 is sealed to the blind end cap 217 using shaft seal 219 and engages with the motor 260 and an opposite portion of the screw 504 resides within the central bore 222 defined by the piston rod 220 (FIGS. 1 through 3).

It should be appreciated that, in certain arrangements in which hydraulic fluid power is used, the hydraulic fluid within the fluid power actuator 106 lubricates the nut 502 and the screw 504. Moreover, in certain arrangements in which pneumatic fluid power being used, an air compressor lubricator may lubricate the screw and nut assembly. In either case, there is no need for other periodic maintenance action to lubricate the set of screw and nut assembly components 500.

It should be further understood that the nut 502 and the screw 504 use a complementary thread geometry which enables self-locking. In some arrangements, the screw and nut assembly 144 uses a self-locking ACME screw whose mechanical efficiency is 35% or less. However, other self-locking screw arrangements use other thread shapes, angles, pitches, depths, etc.

During operation of the fluid power actuator 106, the control system receives, from the set of load sensors 270, a set of load signals indicating how much axial loading currently exists between the screw 504 and the fluid power actuator housing 140. Such axial loading is the load that is parallel to the centerline of the screw shaft, and affects how easily the screw 504 is able to turn within the nut 502.

To extend the fluid power actuator 106, the control system turns the motor 260 so that the screw 504 rotates in a first direction (e.g., counterclockwise) to move the nut 502 in a direction away from the motor 260 (i.e., left to right in FIGS. 2 and 3). During this time, the control system controls the fluid pressure at one or both the ports 214 and 216 to minimize axial loading on the screw 504. Along these lines, the control system may utilize proportional pressure control valve(s) or a variable pressure-controlled pump to achieve the desired fluid pressure differential across the fluid power actuator 106 such that the load cell value is close to zero load. When there is minimal loading (e.g., zero or no axial load on the screw), the motor 260 is able to turn the screw 504 within the nut 502 easily (i.e., very low motor torque is required to rotate the screw 504). Accordingly, the fluid power actuator 106 is able to achieve fine positioning of the load attached to the piston rod assembly 142.

It should be understood that similar operation occurs to retract the fluid power actuator 106. In particular, the control system turns the motor 260 so that the screw 504 rotates in a second direction (e.g., clockwise) to move the nut 502 in a direction toward the motor 260 (i.e., right to left in FIGS. 2 and 3). Again, during this time, the control system controls the fluid power fluid pressure at one or both the ports 214 and 216 to minimize axial loading on the screw 504. Accordingly, the fluid power actuator 106 is able to achieve fine positioning of the attached load in both directions.

Furthermore, when power is removed and fluid power pressure is released, the set of screw and nut assembly components 500 self-lock, i.e., the friction between the nut 502 and the screw 504 is sufficiently high so that the fluid power actuator 106 remains in its current position and no drifting occurs. Along these lines, due to the self-locking thread geometry, the set of screw and nut assembly components 500 provides, among other things, increased stopping speed, drift-proof mechanical locking during power loss, and repeatable and reliable operation. Accordingly, the fluid power actuator 106 is well suited for a variety of equipment in which precision, stability, and reliability are critical.

In some arrangements, the screw 504 connects to or changes to a smooth shaft allowing a shaft to exit the rear of the cylinder through a shaft seal 219 (see FIGS. 1 through 3). For example, the shaft of the motor 260 may serve as the motor shaft to the motor 260.

In some arrangements, the motor 260 is mounted to the rear end of the fluid power actuator housing 140 on the set of load sensors 270 (e.g., load cells which measure the axial load from the screw shaft). The axial load may be reacted by the motor 260 or a separate axial bearing between the motor 260 and fluid power actuator housing 140 (not shown).

In some arrangements, the motor 260 is an electric, servo, or stepper motor. In other arrangements, the motor 260 is a hydraulic or pneumatic fluid power motor.

In some arrangements the motor shaft passes through the rear or the motor, allowing access for back-up manual operation during a power loss (e.g., using a hand crank or hand power tool to turn the screw 504).

Second Embodiments

Figure 5:
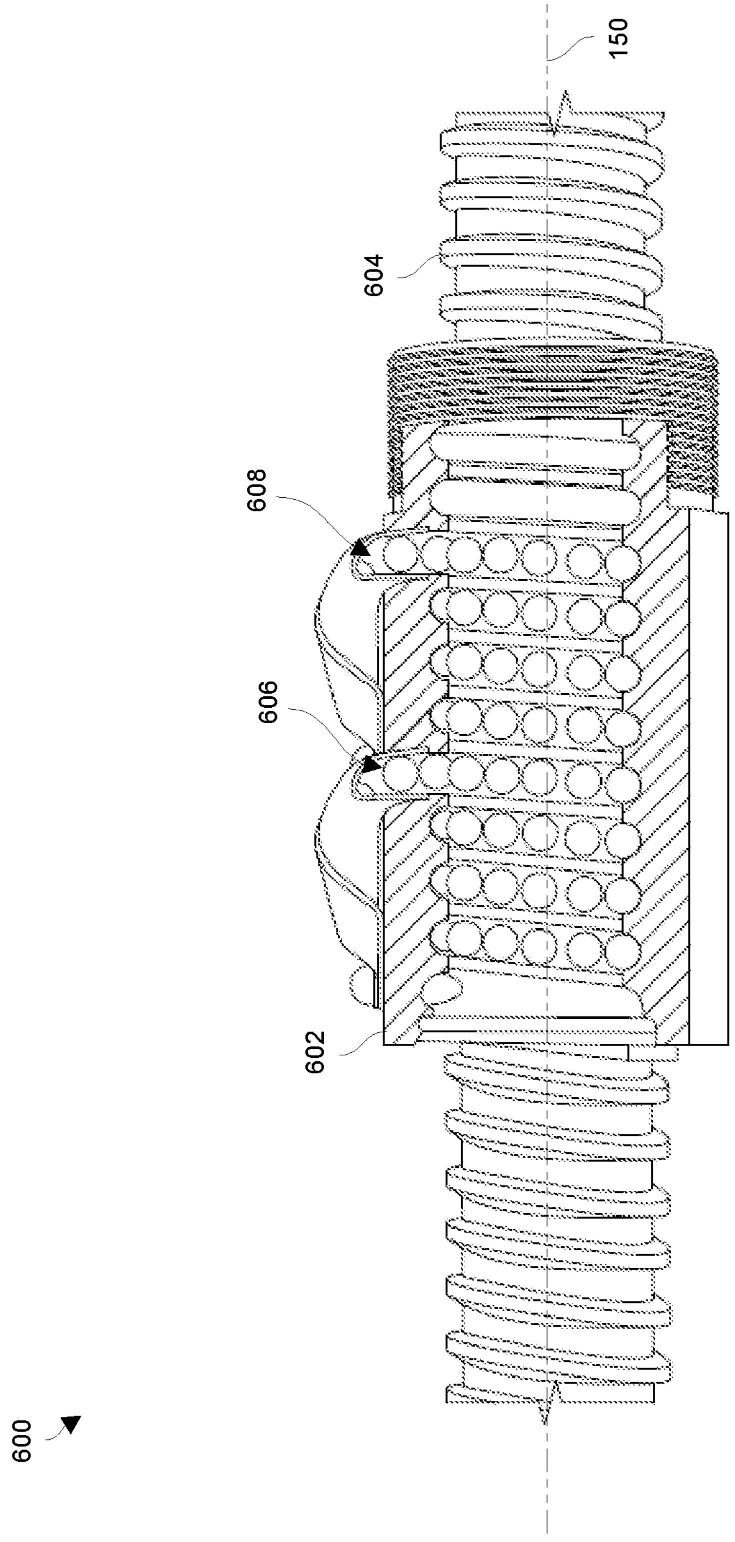
FIG. 5 is a cross-sectional view of another example recirculating ball screw and nut assembly which is suitable for use in the fluid power actuator of FIG. 1 in accordance with certain embodiments.

FIG. 5 shows a cross-sectional side view of a set of screw and nut assembly components 600 which is suitable for use for the screw and nut assembly 144 of the fluid power actuator 106 in accordance with certain second embodiments for the fluid power actuator 106. The set of screw and nut assembly components 600 is a non-self-locking system that includes a recirculating ball nut 602, a ball screw 604 (only a portion of which is shown in FIG. 5), and a plurality of recirculating balls (or bearings) 606.

The actuator axis 150 defined by the fluid power actuator housing 140 is also shown in FIG. 5 to illustrate the orientation of the set of screw and nut assembly components 600 in the context of the fluid power actuator 106 (also see FIGS. 1 through 3). When the set of screw and nut assembly components 600 is employed by the fluid power actuator 106, the nut 602 is disposed in a fixed position relative to the piston rod assembly 142, and the screw 604 threads within the nut 602 while the plurality of balls reside in a recirculating channel 608 defined therebetween to minimize friction. One end of the screw 604 engages with the brake 280 and an opposite end of the screw 604 resides within the central bore 222 defined by the piston rod 220 (FIGS. 1 through 3).

The brake 280 may be mechanically, hydraulically, pneumatically or electronically actuated and released as controlled by the control system. Accordingly, the brake 280 is operatively coupled with the screw 604 (FIGS. 1 through 3). As a result, the brake 280, under electronic control from the control system, can prevent rotation of the screw when applied and/or allow rotation of the screw 604 when released.

In some arrangements, the brake 280 includes a set of springs that biases the brake 280 from a disengaged state to an engaged state. Such spring biasing of the brake 280 into the engaged state prevents the screw 604 from rotating (e.g., actuator locking) when power to the control system is removed.

In some arrangements, the brake 280 is disengaged in response to activity initiated by control system. Along these lines, the brake 280 may be spring applied and released hydraulically, pneumatically, and/or electrically. For example, the brake 280 may take the form of a wet disc hydraulic brake assembly or spring applied electrically released brake.

During operation, the control system governs the position of the piston rod assembly 142 relative to the fluid power actuator housing 140 by managing fluid pressure and timing of the brake release and brake application. By adding position feedback using an external position sensor and using accurately controlling brake actuation timing using known time delays precision actuator positioning can be achieved. Accordingly, the control system is able to provide appropriate timing for brake release, brake re-application, including learning from prior position cycle events, and so on.

In some embodiments, control logic algorithms for the control system enable operation from the control system to be based either solely on actuator position and velocity using brake control timing, or based on measurements of the apparent system inertia from an acceleration profile (e.g., using that information to adjust the brake-application timing for a more precise position control).

It should be appreciated that, in the ball screw embodiments, loading sensors become optional to assist with the timing of the brake release without unwanted load motion, or using other fluid pressure sensors or switches and control logic to determine the safe timing/conditions for brake release without unwanted motion.

It should be further appreciated that back-up manual operation to lower a load without power (e.g., by gravity) simply involves gradual/proportional release of the brake 280 to safely lower the load and operation of the brake 280. Additionally, manual operation to raise a load without power involves manual rotation of the screw 604 coordinated with brake release or use of a one-way sprag clutch allowing rotation in one direction with the brake still engaged.

Figure 6:
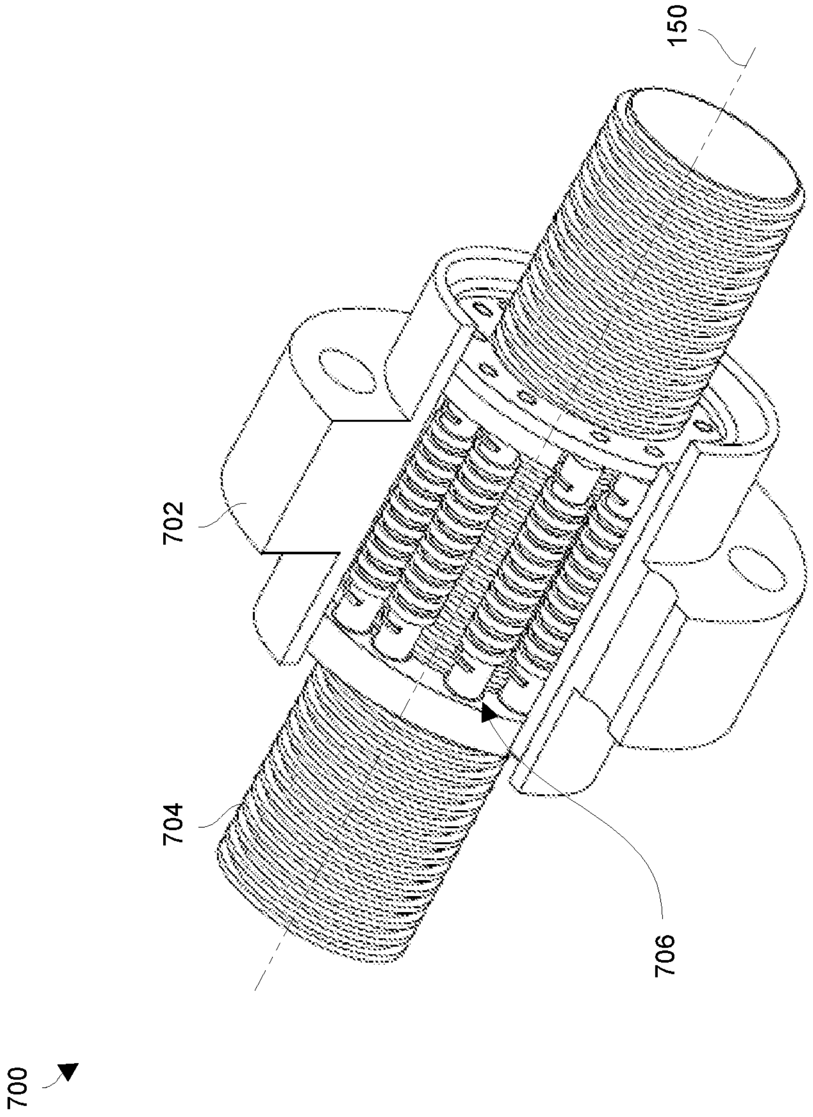
FIG. 6 is a cross-sectional view of another example roller screw and nut assembly which is suitable for use in the fluid power actuator of FIG. 1 in accordance with certain embodiments.

In some arrangements, a non-self-locking ACME screw is used as the set of screw and nut assembly components 600 rather than a recirculating ball screw system shown in FIG. 5. In other arrangements, a non-self-locking roller screw is used as the set of screw and nut assembly components as shown in FIG. 6. Either such arrangement nevertheless provides actuator locking in any position when power is removed due to the presence of the brake 280.

As shown in FIG. 6 and in accordance with some embodiments, a set of screw assembly components 700 is used for the screw assembly 144 rather than the set of screw assembly components 600. That is, the set of screw assembly components 700 is interchangeable with the set of screw assembly components 600.

The set of screw assembly components 700 includes a nut 702, a screw 704 (only a portion of which is shown in FIG. 6), and a plurality of rollers (or threaded members) 706. The plurality of rollers 706, which are held by and within the nut 702 to encircle the screw 704, enables the nut 702 and screw 704 to rotate relative to each other with minimal friction/resistance. Accordingly, as with the set of screw assembly components 600, using the set of screw assembly components 700 enables the fluid power actuator 100 to operate under less power, with finer control/precision, etc.

Further Details

Figure 7:
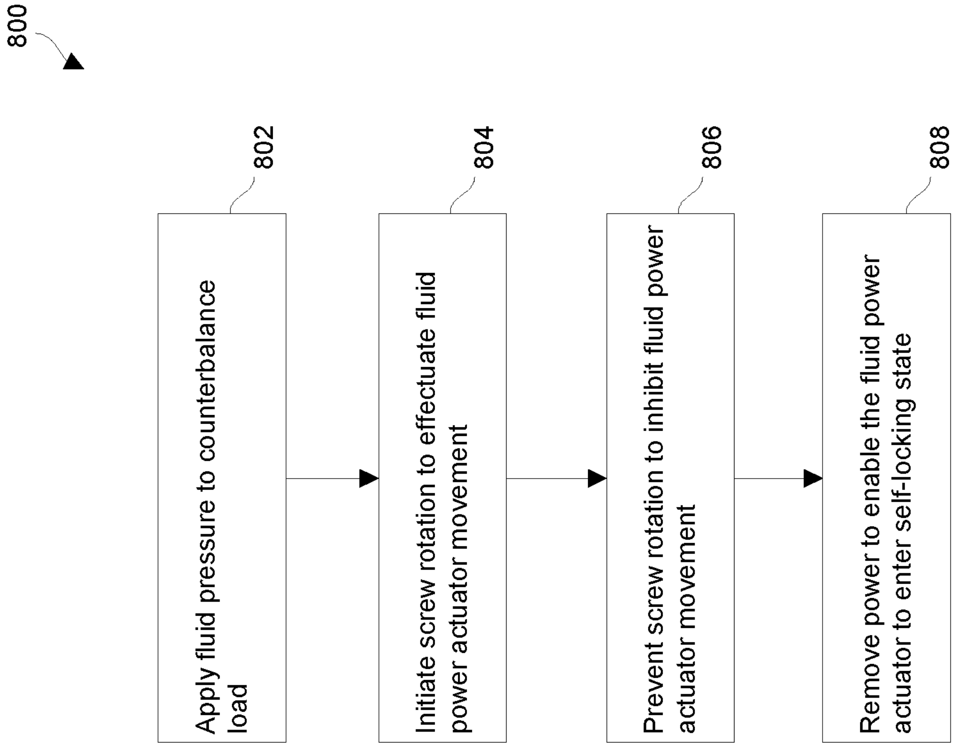
FIG. 7 is a flowchart of a procedure involving a fluid power actuator which utilizes a screw and nut assembly in accordance with certain embodiments.

FIG. 7 is a flowchart of a procedure 800 involving a fluid power actuator which utilizes a screw and nut assembly 144 in accordance with certain embodiments. Such a method may be performed by a controller, e.g., a human operator, control system, combinations thereof, etc.

At 802, the controller applies fluid pressure to one or more of the actuator ports to counter balance the external load applied to the actuator. This may involve using the axial load cell 270 (see FIGS. 1 through 3) or using an external load cell that measures the load directly and calculates the fluid pressure required. Pressure control can be accomplished with a proportional valve or pump control system using either an open-loop control or closed-loop control using one or more fluid pressure transducers. In either case, with the first embodiments, the torque required to turn the screw with a motor 260 is greatly minimized, or in the case of the second embodiments, no motion takes place when releasing the brake 280.

At 804, the controller initiates screw rotation to effectuate high precision fluid power actuator movement. For example, the controller may direct the motor 260 to rotate the screw. In some embodiments, the controller maintains minimal loading on the screw thus enabling the motor to turn the screw using very low torque. In some embodiments, the controller partially or fully releases the brake 280 and further increases or decreases the fluid pressure in the ports 214 and/or 216 to extend or retract the actuator.

At 806, the controller prevents the screw from rotating further. As a result, the fluid power actuator remains in place. In some embodiments, the controller maintains appropriate fluid power pressure in response to axial loading feedback to provide precision and stability. In some embodiments, the controller applies precise braking (e.g., using acceleration, inertia, etc. as factors) for smooth response behavior.

At 808, the controller removes power. As a result, the fluid power actuator automatically enters a self-locking state. In some embodiments, the screw is a self-locking type screw. In some embodiments, a brake automatically returns to an engaged state to hold the screw in place.

As mentioned above, improved techniques involve a fluid power actuator 106 that utilizes a screw and nut assembly 144. The screw and nut assembly 144 enhances fluid power actuator performance such as by providing high precision positioning, simple mechanical locking, and convenient manual back-up operation. In some arrangements, the screw and nut assembly 144 has a self-locking thread geometry. In some arrangements, the screw and nut assembly 144 has a recirculating ball screw or roller screw geometry for low friction operation. Such techniques overcome various deficiencies of conventional fluid power, electric and electro-hydraulic linear actuators.

While various embodiments of the present disclosure have been particularly shown and described, it will be understood by those skilled in the art that various changes in form and details may be made therein without departing from the spirit and scope of the present disclosure as defined by the appended claims.

It should be appreciated that conventional actuators to lift heavy payloads or equipment (such as loading munitions on an aircraft) are typically either fluid power, electric or electro-hydraulic linear actuators. Conventional fluid power actuators have lower position precision, susceptible to leaking/drifting over time, require frequent maintenance to repair leaks, and may need redundant actuators to ensure no failure mode results in loss of load control, required by some agency safety certifications (e.g., U.S. Air Force nuclear certification). Conventional electric actuators are very expensive for high force applications, require periodic lubrication, are difficult to manually move the load in case of loss of power, require internal load holding brakes to prevent unwanted motion when not powered and are not normally designed with high enough safety factors required by nuclear certification standards. Conventional electro-hydraulic actuators have elements of both disadvantages plus are more difficult to package inside compact areas as the motor, pump, reservoir & valve assemblies are all mounted directly to the actuator.

In accordance with certain embodiments, a servo/stepper motor driven self-locking ACME screw and load cell are provided to either a fluid power cylinder or electro-hydraulic actuator. Precision positioning can be accomplished with a very small low torque motor, mechanical locking in any position and manual back-up operation can be provided which counters many of the negative aspect of using a fluid power actuator. Alternatively, by using a non-self-locking lead screw or ball screw and a spring applied, hydraulically, pneumatically or electrically released rotary brake assembly (with or without the servo/stepper motor & load cell), similar advantages can be provided with even fewer components.

In some embodiments, a blind end of the actuator forms a pivot mount (e.g. clevis or trunnion) to an external structure. In some embodiments, a rod end of the piston rod includes a connection to a movable arm with a munitions carrier to position and carry munitions.

In some embodiments, a self-locking ACME screw and nut is added inside a piston rod assembly of a fluid power actuator. The piston rod assembly is externally restrained by other means to prevent the piston rod assembly from rotating. The ACME screw connects to or changes to a smooth shaft allowing a shaft to exit the rear of the cylinder through a shaft seal. A servo or stepper motor is connected to the shaft with the option for the shaft to pass through and exit the rear or the servo motor, allowing access for back-up manual operation using a hand crank or hand power tool. The servo motor is mounted to the rear end of the cylinder on load cells which measure the axial load of the screw shaft. The axial load is either reacted by the servo motor or a separate axial bearing between the servo motor and cylinder. Either a proportional pressure control valve or a variable pressure-controlled pump is used to achieve the proper fluid power pressure differential across the fluid power actuator such that the load cell value is close-to-zero load (e.g., no axial load on the screw). This allows a very low motor torque required to rotate the screw for fine positioning of the load attached to the actuator. Either hydraulic fluid or compressed air lubricators may lubricate the screw and nut, preventing the need for periotic maintenance action to lubricate the screw. When power is removed, the pressure is released and the self-locking ACME screw will lock the actuator in position.

In other embodiments, a non-self-locking ACME screw, a recirculating ball screw, or a roller screw is used and the servo/stepper motor is replaced with a spring applied, hydraulically/pneumatically/electrically released rotary brake (such as a wet disc hydraulic brake assembly or spring applied electric motor brake). This also provides actuator locking in any position when power is removed. Use of the load cells may be used to assist with the timing of the brake release without unwanted load motion. Use of other fluid pressure sensors or switches and control logic may also be used to determine safe timing and conditions for brake release without unwanted load motion. Precision positioning may be achieved using an external position sensor and the appropriate timing of the brake release and brake re-application. Such control logic algorithms can be based on actuator position and velocity using brake control timing. Additionally or alternatively, such control logic algorithms can measure apparent system inertia from the acceleration profile and use that information to adjust the brake-application timing for a more precise position control. Optional back-up manual operation enables gradual or proportional release of the brake to safely lower the load. Manual operation of the screw further enables the completion of back-up lifting operations.

In some embodiments, the screw is constructed and arranged to rotate relative to the fluid power actuator housing and the piston and nut are constrained to not rotate where their translation is controlled by the rotation angle of the screw, and screw rotation is controlled with an actuator or brake.

In some embodiments, the screw is constructed to be non-rotating relative to the fluid power actuator housing, and the piston and nut are constructed to rotate and translate relative to the screw, where the piston translation is controlled by the rotation angle of the nut and the nut rotation is controlled with an actuator or brake.

In some embodiments, the fluid power actuator is single acting where fluid pressure is used on one side of the piston and gravity or a spring is used for motion in the opposite direction.

In some embodiments, the fluid power actuator is double acting where fluid pressure is used on both sides of the piston for motion in either direction.

In some embodiments, the nut and the screw define threads with lead angles and/or material properties that are self-locking between the nut and the screw. An example of a nut and a screw with a self-locking feature is an ACME screw where mechanical efficiency is below 35 percent. With a self-locking screw, a rotational actuator (e.g., electrical, hydraulic, or pneumatic motor) is used to control the angular position of the screw or nut which in turn controls the position of the piston.

In some embodiments, the nut and the screw define threads with lead angles and/or material properties that are not self-locking between the nut and the screw. An example of a nut and a screw that is not self-locking is a recirculating ball nut or roller screw nut where mechanical efficiencies are over 90%. With a non-self-locking screw, a rotational brake (e.g., electrical, hydraulic, pneumatic or mechanical brake) is used to control the angular position of the screw or nut which in turn controls the position of the piston.

In some embodiments, the fluid power actuator further includes a load sensor coupled with the fluid power actuator housing and the screw or nut, a fluid power pressure-controlled system (e.g., pressure-controlled pump or valves) coupled with one or both of the fluid power cylinder pressures on either side of the piston, and an electronic controller coupled with the load sensor and the fluid power pressure control system. The electronic controller is constructed and arranged to receive a sensor signal from the load sensor and operate the fluid power pressure control system to provide changes in the fluid pressure based on the sensor signal.

In some embodiments, the load sensor includes a load cell constructed and arranged to indicate, within the sensor signal, an amount of loading between the fluid power actuator housing and the screw or nut. Additionally, the electronic controller, when providing the changes in the fluid pressure based on the sensor signal, is constructed and arranged to minimize loading between the fluid power actuator housing and the screw or nut, thereby allowing a very small, low torque, low power motor to be used for the application.

In some embodiments, the fluid power actuator further includes an electronic controller coupled with the electrically controlled motor or brake. The electronic controller is constructed and arranged to coordinate motor or brake operation with movement between the fluid power actuator housing and the piston to provide precision positioning.

In some embodiments, the brake includes a set of springs that biases the brake from a disengaged state to an engaged state to provide actuator locking when power to the electronic controller is removed. Such a brake may be controlled in various ways such as hydraulically, pneumatically, or electrically.

It should be understood that the various actuator embodiments disclosed herein may be well-suited for certain specialized applications such as munitions handling equipment, aircraft munitions loading, and so on. Other applications include commercial and/or military material handling applications, lift trucks, belt loaders or de-icers and/or washer vehicles, and so on. Such modifications and enhancements that are disclosed herein are intended to belong to various embodiments of the disclosure.

What is claimed is:

1. A fluid power actuator comprising:
- a housing comprising:
  - a cylinder,
  - an end cap to seal a blind end of the cylinder, and
  - a rod end cap to guide a piston rod relative to the cylinder;
- a piston rod assembly comprising:
  - a piston that travels within the cylinder in response to fluid pressure within the cylinder, the piston having a nut, and
  - the piston rod connecting the piston to an external load using a piston rod end, the piston rod being hollow to allow a screw to be partially or fully located inside the piston rod;
- a screw and nut assembly comprising:
  - the screw that couples the blind end of the cylinder to the nut, wherein the screw extends in part or in whole inside the piston rod, the screw and nut assembly being constructed and arranged to control movement of the piston relative to the housing, and
  - a motor that controls a position of the nut relative to the screw;
- a load sensor that measures an axial load that the screw imposes on the housing and provides a load signal indicating the axial load; and
- an electronic controller coupled with the load sensor and a fluid power pressure-controlled system that adjusts the fluid pressure on at least one side of the piston to adjust the axial load, wherein the electronic controller is constructed and arranged to:
  - receive, from the load sensor, the load signal indicating the measured axial load that the screw imposes on the housing, and
  - based on the load signal, direct an increase in the fluid pressure on a particular side of the piston, the increase in the fluid pressure on the particular side decreasing the axial load that the screw imposes on the housing;
- wherein the screw forms at least a part of a rotor shaft of the motor.

2. A fluid power actuator as in claim 1 wherein the motor controls rotation of the screw relative to the nut comprising a non-rotating nut.

3. A fluid power actuator as in claim 1 wherein the screw is self-locking.

4. A fluid power actuator as in claim 1 wherein the screw is non-self-locking and the motor contains a brake.

5. A fluid power actuator as in claim 1 further comprising:
- an external position sensor that augments position actuator control logic using a closed-loop position control.

6. A fluid power actuator as in claim 1 wherein motor and/or brake torque application and/or release is timed based on previously measured and recorded load command and response behavior.

7. A fluid power actuator as in claim 1, wherein the load sensor is an external load cell; and
- wherein the electronic controller uses the external load cell to measure the axial load directly or indirectly, and controls the fluid pressure with open-loop control.

8. A fluid power actuator as in claim 1, wherein the load sensor is an external load cell; and
- wherein the electronic controller uses the external load cell to measure the axial load directly or indirectly, and controls the fluid pressure with closed-loop control using at least one pressure transducer.

9. The fluid power actuator as in claim 1, wherein the motor is coupled with the screw and is constructed and arranged to rotate the screw relative to the housing; and
- wherein the load sensor is disposed between and coupled with the housing and the motor to measure the axial load that the screw imposes on the housing.

10. The fluid power actuator as in claim 9, wherein the end cap of the housing defines a hole, the screw including the rotor shaft disposed on an outer side of the housing and an inner portion extending through the hole and within the cylinder; and
- wherein the load sensor includes a first side mounted on the outer side of the housing and a second side mounted on the motor, the motor engaging the rotor shaft of the screw.

11. The fluid power actuator as in claim 1, wherein the load sensor is a load cell constructed and arranged to provide the load signal which identifies a current amount of the axial load placed on the screw when the axial load is present between the screw and the housing.

12. The fluid power actuator as in claim 11, wherein the load cell provides the load signal as a first load cell value when there is a first axial load present between the screw and the housing, and provides the load signal as a second load cell value when there is a second axial load present between the screw and the housing, the first axial load and the second axial load being greater than zero axial load present between the screw and the housing.

13. A fluid power actuator comprising:

a housing comprising:

a cylinder, an end cap to seal a blind end of the cylinder, and a rod end cap to guide a piston rod relative to the cylinder;

a piston rod assembly comprising:

a piston that travels within the cylinder in response to fluid pressure within the cylinder, the piston having a nut, and the piston rod connecting the piston to an external load using a piston rod end, the piston rod being hollow to allow a screw to be partially or fully located inside the piston rod; and a screw and nut assembly comprising:

the screw that couples the blind end of the cylinder to the nut, wherein the screw extends in part or in whole inside the piston rod, the screw and nut assembly being constructed to be non-self-locking and arranged to control movement of the piston relative to the housing, and a brake that controls a position of the nut relative to the screw;

a load sensor that measures an axial load that the screw imposes on the housing and provides a load signal indicating the axial load; and an electronic controller coupled with the load sensor and a fluid power pressure-controlled system that adjusts the fluid pressure on at least one side of the piston to adjust the axial load, wherein the electronic controller is constructed and arranged to:

receive, from the load sensor, the load signal indicating the measured axial load that the screw imposes on the housing, and based on the load signal, direct an increase in the fluid pressure on a particular side of the piston, the increase in the fluid pressure on the particular side decreasing the axial load that the screw imposes on the housing;

wherein the screw includes an outer shaft portion disposed on an outer side of the housing, the brake being constructed and arranged to engage the outer shaft portion to restrict rotation of the screw relative to the nut.

14. A fluid power actuator as in claim 13 wherein the brake controls rotation of the screw relative to the nut comprising a non-rotating nut.

15. A fluid power actuator as in claim 13 wherein the screw is a non-self-locking recirculating ball screw, roller screw, or ACME screw.

16. A fluid power actuator as in claim 13 further comprising:

an external position sensor that augments position actuator control logic using a closed-loop position control.

17. A fluid power actuator as in claim 13 wherein motor and/or brake torque application and/or release is timed based on previously measured and recorded load command and response behavior.

18. A fluid power actuator as in claim 13, wherein the load sensor is an external load cell; and wherein the electronic controller uses the external load cell to measure the axial load directly or indirectly, and controls the fluid pressure with open-loop control.

19. A fluid power actuator as in claim 1, wherein the load sensor is an external load cell; and wherein the electronic controller uses the external load cell to measure the axial load directly or indirectly, and controls the fluid pressure with closed-loop control using at least one pressure transducer.

* * * * *